US012578301B2

(12) United States Patent
Das et al.

(10) Patent No.: US 12,578,301 B2
(45) Date of Patent: Mar. 17, 2026

(54) PRINTED GRAPHENE ELECTROCHEMICAL PHOSPHATE SENSORS

(71) Applicant: Kansas State University Research Foundatno, Manhattan, KS (US)

(72) Inventors: Suprem R. Das, Manhattan, KS (US); Rajavel Krishnamoorthy, Manhattan, KS (US); Thiba Nagaraja, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 175 days.

(21) Appl. No.: 18/399,402

(22) Filed: Dec. 28, 2023

(65) Prior Publication Data

US 2024/0192162 A1 Jun. 13, 2024

Related U.S. Application Data

(63) Continuation-in-part of application No. PCT/US2023/066828, filed on May 10, 2023.

(60) Provisional application No. 63/477,886, filed on Dec. 30, 2022, provisional application No. 63/340,126, filed on May 10, 2022.

(51) Int. Cl.
*G01N 27/413* (2006.01)
*G01N 27/30* (2006.01)
*G01N 27/333* (2006.01)
*G01N 27/49* (2006.01)

(52) U.S. Cl.
CPC ......... *G01N 27/413* (2013.01); *G01N 27/301* (2013.01); *G01N 27/308* (2013.01); *G01N 27/333* (2013.01); *G01N 27/49* (2013.01)

(58) Field of Classification Search
CPC .. G01N 27/413; G01N 27/301; G01N 27/308; G01N 27/49; G01N 27/3278; G01N 27/333
See application file for complete search history.

(56) References Cited

FOREIGN PATENT DOCUMENTS

JP 58189552 A * 11/1983 ............. G01N 31/00

OTHER PUBLICATIONS

Nehru et al., "Electrochemical Sensing of Serotonin by a Modified MnO2-Graphene Electrode," Biosensors 2020, 10, 33; doi: 10.3390/bios10040033 (Year: 2020).*

(Continued)

*Primary Examiner* — Alexander S Noguerola
(74) *Attorney, Agent, or Firm* — Hovey Williams LLP

(57) ABSTRACT

Graphene-based electrochemical sensors and uses thereof in detecting and measuring the concentration of a target substance with a sample are provided. In particular, the sensors, comprising electrodes printed from a graphene ink, can be configured to monitor phosphate ion concentration in the environment, including within soil and/or surface water.

17 Claims, 7 Drawing Sheets

(56) References Cited

OTHER PUBLICATIONS

Secor et al., "Tailoring the Porosity and Microstructure of Printed Graphene Electrodes via Polymer Phase Inversion," J. Phys. Chem. C 2018, 122, 13745-13750 with Supplementary Information (Year: 2018).*
EPO machine-generated English language translation of JP 58189552 A, patent published Nov. 5, 1983 (Year: 1983).*
Kumar, V.; Kumar, A.; Lee, D.-J.; Park, S.-S. Estimation of Number of Graphene Layers Using Different Methods: A Focused Review. Materials 2021, 14, 4590 (Year: 2021).*
Office Action dated Sep. 10, 2025 corresponding to U.S. Appl. No. 18/399,402.

* cited by examiner

PRINTED GRAPHENE ELECTROCHEMICAL PHOSPHATE SENSORS

RELATED APPLICATIONS

This application claims the benefit of U.S. Provisional Patent Application No. 63/477,886, filed Dec. 30, 2022, and this application is a continuation-in-part of International Patent Application No. PCT/US2023/066828, filed May 10, 2023, which claims the benefit of U.S. Provisional Patent Application No. 63/340,126, filed May 10, 2022, all of which are incorporated by reference herein in their entireties.

STATEMENT REGARDING FEDERALLY SPONSORED RESEARCH

This invention was made with government support under Grant No. 1935676 awarded by the National Science Foundation (NSF). The government has certain rights in the invention.

BACKGROUND OF THE INVENTION

1. Field of the Invention

Embodiments of the present invention are directed toward highly stable and reliable printed graphene electrodes. The fabricated graphene electrodes can be used in the manufacture of electronic sensors for various applications and fields including, but not limited to, soil health/nutrient sensors.

2. Brief Description of the Prior Art

Phosphorus (P) is an essential element for many biological processes in living organisms. Phosphorus is generally present in nature in compounds associated with mineral sources in the form of phosphate ions ($PO_4^{3-}$) and geochemical sinks, including in the form of soil phosphorus. Esters and anhydrides of the phosphates, due to their remarkable stability in water at ambient temperatures and physiological pH, form the key elements in living cells' genetic codes (such as in the nucleic acids RNA and DNA), cellular walls (lipid bilayers), cellular powerhouse (such as adenosine triphosphate (ATP) in mitochondria), as well as bone and teeth growth. In the agricultural sector, phosphorus-containing fertilizers are widely used to maintain and/or enhance soil macronutrient levels, fostering profitable crop production that importantly helps in feeding the growing global population. When plants are deprived of phosphate, growth is diminished, maturity is delayed, and crop yield is reduced. However, excessive phosphate levels in the environment causes surface water eutrophication leading to overabundance of algal growth and subsequent depletion of oxygen in water bodies. This can be a serious threat to healthy ecosystems.

The ability to detect phosphate levels in water and soil environment is important in addressing this environmental concern. The standard EPA-approved molybdenum blue method for detecting soluble phosphates is a colorimetric technique that involves the addition of phosphate ion to molybdate in an acidified medium to form phosphomolybdate complex (P—Mo), known as Keggin anion as reported in equation 1. Subsequently, the presence of potassium antimony tartrate as a catalyst and ascorbic acid as a reducing agent facilitates the reduction of P—Mo complex to a mixed molybdenum oxidation state (equation 2). The reduced complex appears blue and the intensity of the blue color increases as the concentration of phosphate ions in the sample increases. This phenomenon is quantifiable using either traditional laboratory-based spectrophotometry or portable spectrophotometric devices.

$$7H_3PO_4 + 12Mo_7O_{24}^{6-} + 51H^+ \rightarrow 7PMo_{12}O_{40}^{3-} + 36H_2O \qquad (1)$$

$$PMo_{12}O_{40}^{3-} + ne^- + nH^+ \rightarrow [H_nPMo_m(V)Mo_{12-m}(VI)O_{40}]^{3-} \qquad (2)$$

However, the refractive index errors and turbidity interferences in this approach provide uncertainties in the measurements. Other techniques used routinely are laboratory-based analytical methods, such as ion chromatography and mass spectroscopy that require skilled personnel for operation, complex measurement protocol, and large space for instrumentation. Conversely, several more convenient techniques, including optical fluorescence and electroanalysis, are available for point-of-care (POC) phosphate detection, in addition to the colorimetric method mentioned earlier. Out of these techniques, electroanalysis has gained prominence owing to its ability to facilitate direct electron/carrier transfer and transduction, providing high-resolution signals that could be compatible with a wide variety of electronic platforms, including wireless and continuous monitoring systems. To this regard, the molybdenum blue method has been modified in some electrochemical techniques for phosphate detection where the P—Mo complex formed is directly reduced at the working electrode surface without an external reducing agent such as ascorbic acid and a catalyst, potassium antimonyl tartrate. Thus, a careful evaluation of the material used as a working electrode in this electrochemical analysis is necessary to obtain optimal detection limits of phosphate to ensure the development of reliable sensors.

SUMMARY OF THE INVENTION

According to one embodiment of the present invention there is provided a method of testing a sample, preferably a soil or surface water sample, for the presence of a target substance, preferably phosphate ions. The method comprises dispersing the sample within a medium comprising a recognition agent that is operable to react with the target substance. The medium within which the sample is dispersed is contacted with a sensing device. The sensing device comprises a printed graphene electrode, a counter electrode, and a reference electrode. An electrochemical reaction is induced between the target substance and the recognition agent. A peak current signal is detected with the sensing device at a characteristic applied voltage to the working electrode with respect to the voltage electrode. The peak current signal at the characteristic voltage is proportional to the concentration of the target substance within the sample.

According to another embodiment of the present invention there is provided a method of testing a sample (e.g., a soil or surface water sample) for the presence of a target substance (e.g., phosphate ions). The method comprises dispersing the sample within an electrolyte medium. The medium within which the sample is dispersed is contacted with a sensing device. The sensing device comprises a functionalized printed graphene electrode, a counter electrode, and a reference electrode. The functionalized printed graphene electrode comprises a functional species that is operable to induce an electrochemical reaction with the target substance. An electrochemical reaction is induced between the target substance and the functional species. A peak current signal at a characteristic applied voltage is detected with the sensing device. The current signal at a characteristic applied voltage is proportional to the concentration of the target substance within the sample.

According to a further embodiment of the present invention there is provided a sensing device for measuring the concentration of phosphate ions within a test sample. The sensing device comprises a printed graphene electrode, a counter electrode, and a reference electrode. The printed graphene electrode comprises few atomic layered graphene particles.

According to yet another embodiment of the present invention there is provided a method of manufacturing a graphene electrode. The method comprises printing an electrical trace onto a thin film substrate using a graphene ink. The graphene ink comprises few atomic layered graphene particles that are encapsulated by an exfoliating agent and dispersed within a liquid vehicle system. The thin film substrate having the electrical trace printed thereon is annealed to decompose the exfoliating agent and remove at least a portion of the liquid vehicle system.

DETAILED DESCRIPTION OF THE PREFERRED EMBODIMENT

In one or more embodiments, electrodes are fabricated through a printing process that utilizes a conductive graphene ink. Conductive graphene inks, such as those described in International Patent Application No. PCT/US2023/066828, filed May 10, 2023, which claims the benefit of U.S. Provisional Patent Application No. 63/340,126, filed May 10, 2022, both being incorporated by reference herein in their entireties, can be used in such processes. Various printing techniques, including inkjet, microplotter, drop casing, spin coating, spray coating, screen, gravure, flexographic and extrusion printing, can be used to fabricate electrodes that can be used in electronic and electrochemical sensors.

In preferred embodiments, the graphene ink is comprised of graphene particles that are dispersed in a liquid vehicle system. The graphene particles can be comprised of pristine or nearly pristine graphene flake that are formed through an exfoliation process. The pristine graphene used is atomically flat, with substantially no oxygen atoms present. This is distinguished from graphene manufactured according to other processes, such as graphene aerosol gel manufactured by a detonation process. In order to achieve desired electronic characteristics, a graphitic material is exfoliated into few atomic layered graphene via a controlled exfoliation process. As used herein, "few atomiclayered graphene" refers to graphene comprising 20 or fewer atomic layers (e.g., 15 or less, or 10 or less). In certain embodiments, the ink compositions may utilize a quantity of few atomic layered graphene particles having an average thickness of 4 to 20 atomic layers, or 5 to 10 atomic layers. In certain embodiments, the quantity of few atomic layered graphene particles may have an average thickness of less than 10 atomic layers. As used herein, "average thickness" refers to the mean average of the number of atomic layers of at least 20 randomly selected particles from the quantity of graphene particles.

The graphene particles may generally range from about 100 nanometers to about 1.3 micrometers in size (based on the largest lateral dimension). In one of more embodiments, the quantity of graphene particles may be in the form of flakes having a mean average lateral dimension (D50) of about 200 nanometers to about 300 nanometers.

Figure 1:
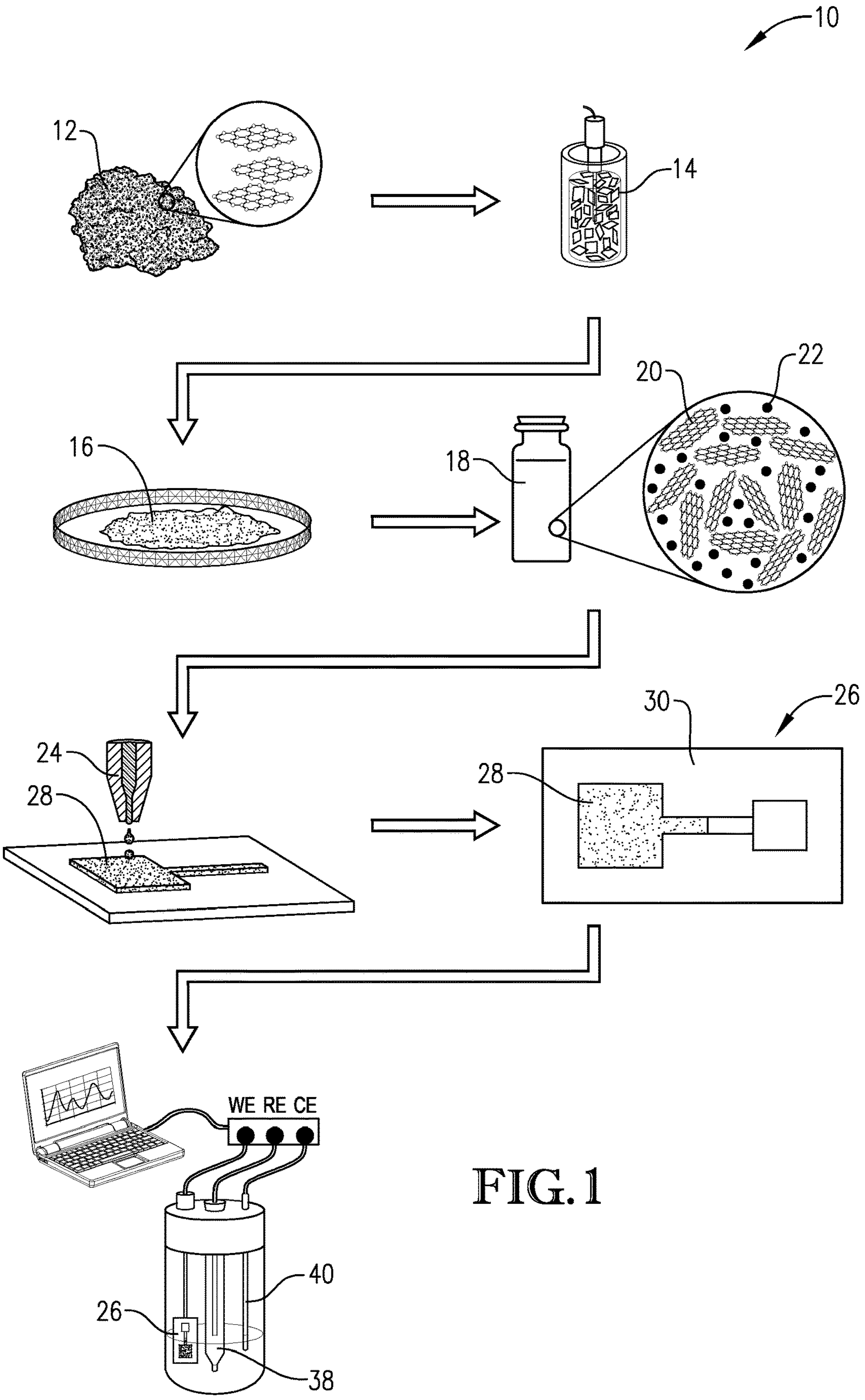
FIG. 1 schematically depicts a process for exfoliation of graphite to graphene, formation of a graphene ink and printed sensor comprising the graphene ink.

Controlled exfoliated synthesis of few atomic layered graphene can be achieved by number of process steps and/or formulations. Turning to FIG. 1, an exemplary process 10 for producing graphene, graphene ink, and printed graphene sensors is shown. Bulk graphite powder 12 undergoes a liquid phase exfoliation 14 in which the graphite powder is dispersed within a liquid dispersant (e.g., ethanol, water, ethanol and terpineol, toluene, or any other suitable dispersant). An exfoliation agent, such as ethyl cellulose, nitrocellulose, carboxymethylcellulose, or mixtures thereof, is added to the liquid dispersion. Energy generated from a shock wave is then added to the liquid dispersion, preferably originating from a cavitation from an ultrasonication process, to cause at least a portion of the graphite powder to exfoliate into few atomic layered graphene particles comprising less than 20, less than 15, or less than 10 atomic layers. The resulting exfoliated graphene particles are at least partially encapsulated by the exfoliating agent.

At least a portion of the encapsulated graphene particles are separated from the dispersion to form an exfoliated graphene powder 16.

The encapsulated graphene particles then can be used to form a graphene ink 18. As can be seen, the graphene particles 20 are encapsulated by the exfoliating agent 22. In one or more embodiments, the encapsulated graphene particles are dispersed within a liquid vehicle system to form the graphene ink. In certain embodiments, the liquid vehicle system comprises one or more ketones, one or more alcohols, or a mixture of one or more ketones and alcohols. In a preferred embodiment, the liquid vehicle comprises cyclohexanone and terpineol. Other organic solvents having relatively high boiling points may also be used. The encapsulated graphene particles may be present within the ink in an amount of from about 5 wt. % to about 85 wt. % and will generally depend upon the type of printing process intended for the ink. For example, in some embodiments, the encapsulated graphene particles are present within the ink in an amount of about 5 wt. % to about 20 wt. %, or about 10 wt. % to about 15 wt. %. In some other embodiments, the encapsulated graphene particles are present within the ink in an amount of about 50 wt. % to about 85 wt. %, or about 60 wt. % to about 75 wt. %. The graphene ink can be formulated for nearly any printing technique; however digital printing techniques such as inkjet and microplotter printing 24 are preferred.

Figure 2A:
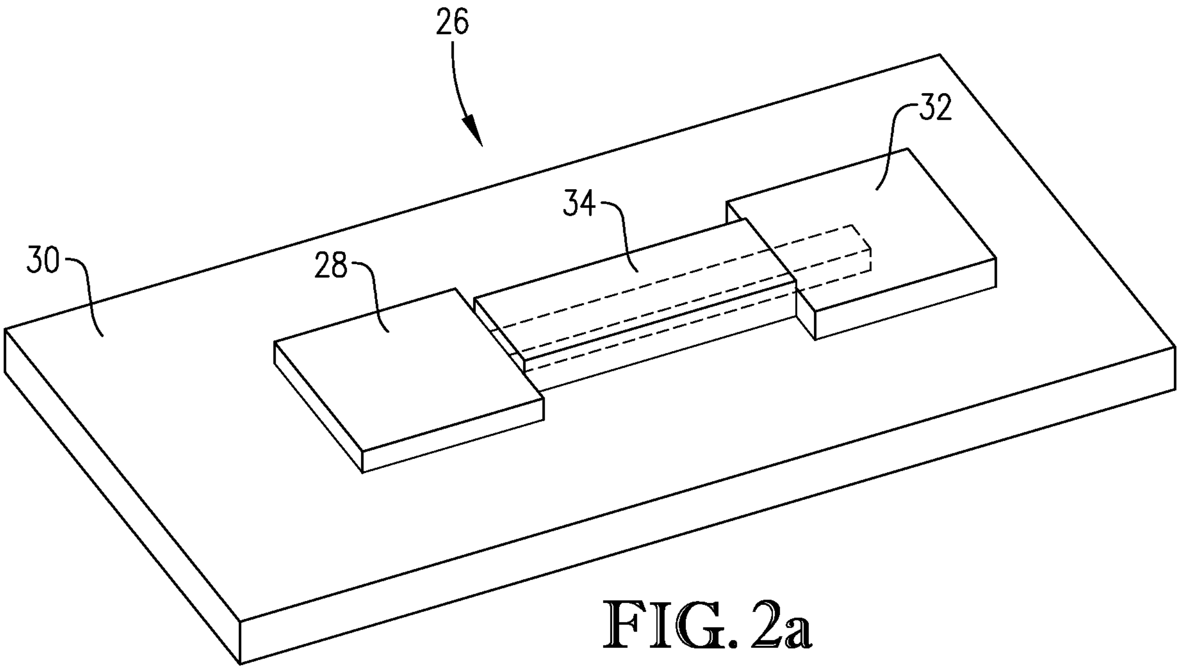
FIGS. 2*a* and 2*b* schematically depict exemplary printed graphene sensors made using a graphene ink.
Figure 2B:
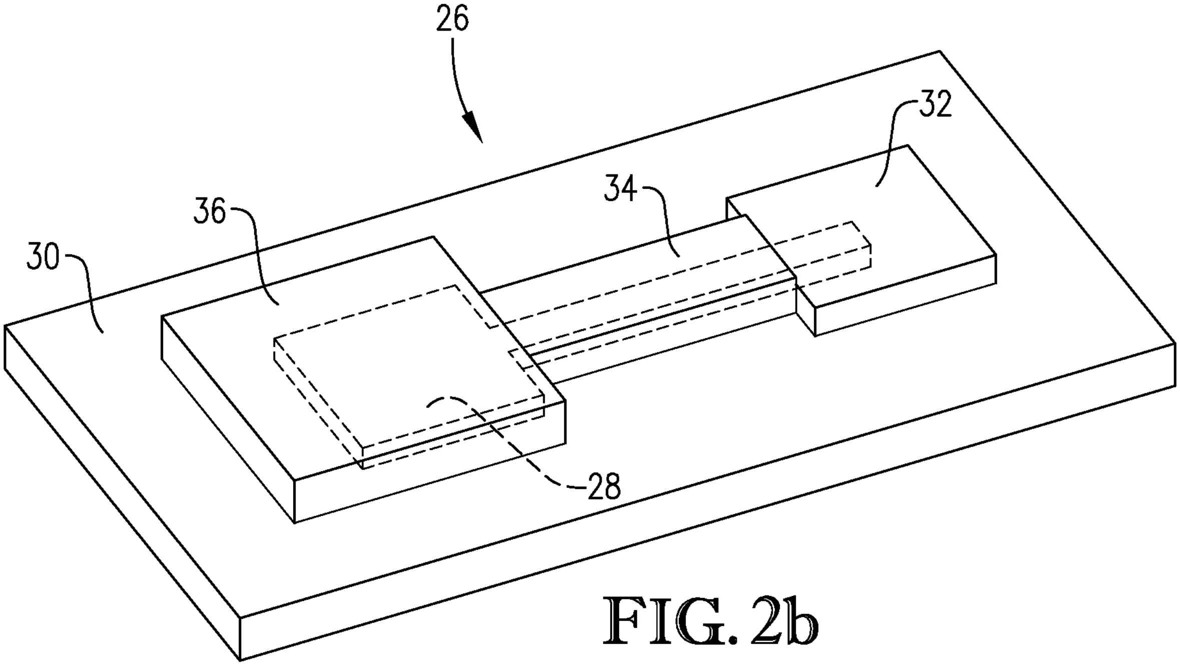

In one or more embodiments, electronic or electrochemical electrodes 26 for use in sensing devices can be manufactured comprising one or more traces 28 printed with a graphene ink as described herein. FIG. 2*a* depicts an exemplary printed graphene electrode 26 constructed in accordance with one embodiment of the present invention. Particularly, the electrode 26 comprises a substrate 30, especially a thin film substrate such as Kapton, the graphene trace 28 and an electrical lead 32, preferably formed from a metallic conductor such as silver and/or silver nanoparticles. An insulating layer 34 can be applied over the interface between the graphene trace 28 and the electrical lead 32. In certain embodiments, the insulating layer 34 comprises a non-conductive polymer material, such as a nitrocellulose and acetate-based polymer mixture dispersed in isopropyl alcohol, polylactic acid (PLA), or a thin ceramic coating. The electrical lead 32 and/or the insulating layer 34 can be printed onto the substrate in the same or a different manner that the graphene trace 28 is printed. FIG. 2*b* depicts an alternate embodiment of electrode 26 in which a functional species 36 is applied over at least a portion of the graphene trace 28, preferably over a portion of the graphene trace that does not include the insulating layer 34. Alternatively, the functionalization species can be mixed with the graphene ink to form a functionalized graphene ink that is printed to form the electrode. The functional species is selected based on its ability to induce an electrochemical reaction with the particular target substance to be detected and/or measured by the sensor. If the sensor is a phosphate sensor that is operable to detect phosphate ions present within, for example, a soil or surface water sample, the functional species comprises a molybdenum compound (e.g., ammonium tetra molybdate) and/or a tungsten compound. The functional species can be bound to the graphene trace using a binding agent, such as a polysaccharide (e.g., chitosan).

By adopting suitable reaction chemistry, the selective chemical complexes are prepared by appropriate mixing of the polysaccharide and functional species in the presence of an acid solution. In certain embodiments, the acid comprises an organic acid such as acetic acid.

In one or more embodiments, the functional species, preferably a molybdate or tungstate compound such as ammonium tetra molybdate, is added in an amount of 0.1 to 1 g and the polysaccharide, preferably chitosan, is added in an amount of 0.05 to 0.15 g in 0.1 M of acetic acid solution under continuous stirring for about 12 h to obtain a homogeneous solution. The reaction mixture is then applied onto the printed graphene electrode (e.g., by drop casting at a level of 2 to 10 μL) and allowed to dry at 30-50° C. for 1-3 h. After complete drying, electrodes can be washed with water followed by 0.1M KCl.

The graphene ink trace can be applied to the substrate as multiple layers of ink, each layer being applied during a separate printing pass. In one or more embodiments, the graphene ink trace may comprise at least 2, at least 4, at least 6, or at least 8, but less than 20, less than 15, or less than 12 layers or printing passes, resulting in a trace thickness of at least 0.5 μm, at least 1 μm, or at least 2 μm, but less than 10 μm, less than 7.5 μm, or less than 5 μm. During sensor construction, after printing of the ink trace upon the substrate, the substrate and ink can be annealed in order to decompose and volatilize at least a portion of the exfoliating agent (e.g., ethyl cellulose) encapsulating the graphene flakes and the ink's liquid vehicle system. The annealing process may include rapid thermal annealing, photonic annealing, photonic curing, laser annealing, and the like. As the exfoliating agent can exhibit electrically insulative properties, the above treatments and subsequent removal of the exfoliating agent serve to improve the overall conductivity of the graphene ink. In certain embodiments, the heat treatment can occur by heating the substrate bearing the ink trace within an oven at a temperature of from 300° C. to 375° C.

Figure 8:
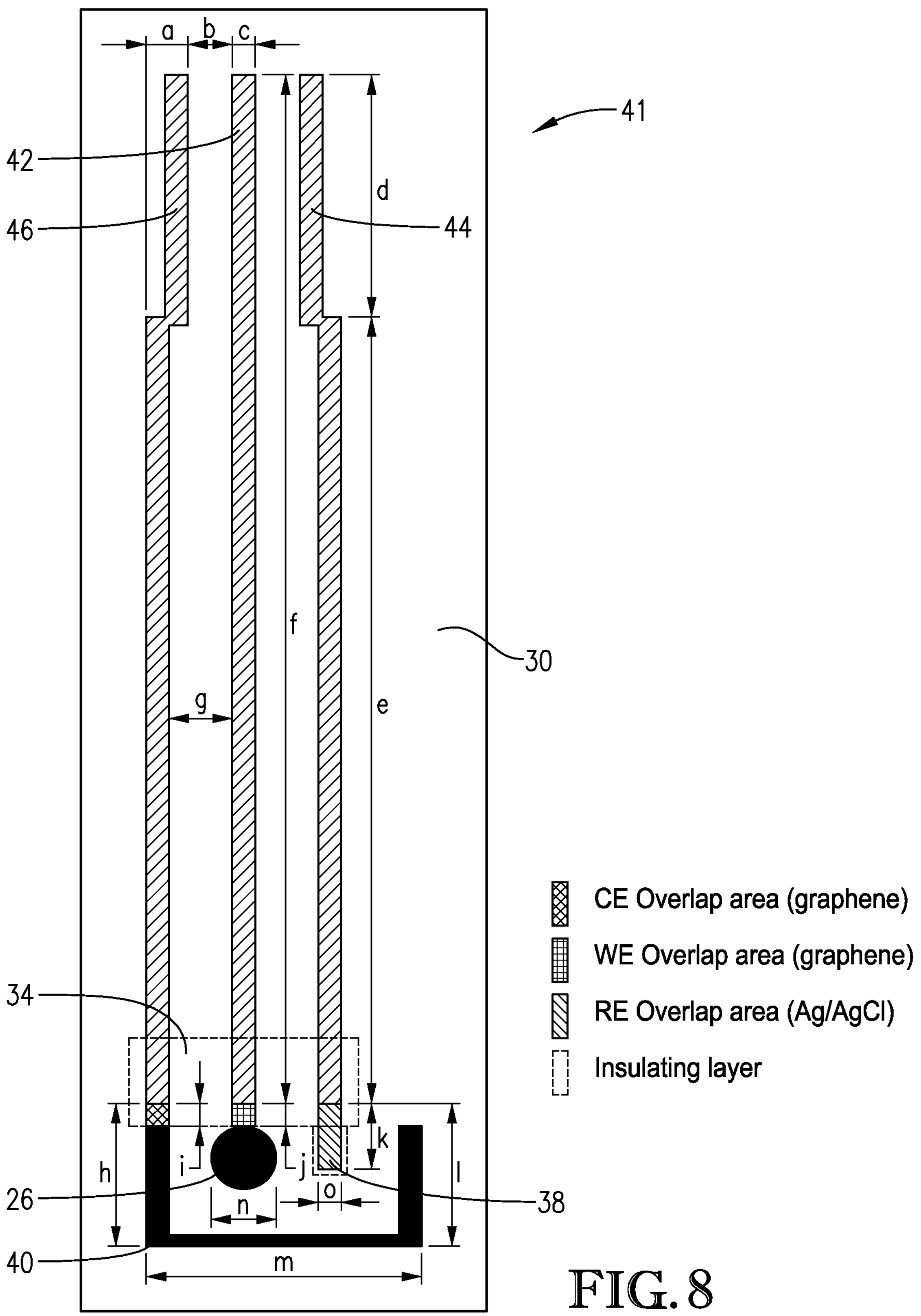
FIG. 8 is a schematic depiction of an exemplary compact printed graphene sensor.

Turning to FIG. 8, a miniaturized sensing device 41 is illustrated comprising a graphene working electrode 26, a silver reference electrode 38, a graphene counter electrode 40 printed onto a substrate 30. The graphene working electrode 26 is optionally provided with a functionalized species bonded thereto, depending upon the desired mode of operation for the sensing device. The counter electrode 40 can be configured with a U-shaped "tail" that extends below at least the working electrode 26, and preferably also the reference electrode 38. In certain embodiments, the counter electrode "tail" at least partially surrounds the working electrode 26, and optionally the reference electrode 38, to keep the electric flux directed inwards toward the working electrode 26 located in the center of the device 41. In addition to comprising the same graphene material as the working electrode 26, the counter electrode may also be fabricated from platinum, printed conductive carbon, printed glassy carbon, or printed activated carbon. Exemplary dimensions for the structures depicted in FIG. 8 are listed in Table 1, below.

TABLE 1

| Dimension | Length (mm) | Dimension | Length (mm) |
|---|---|---|---|
| a | 1 | i | 2 |
| b | 1.5 | j | 2 |
| c | 1 | k | 6 |
| d | 20 | l | 9 |
| e | 60 | m | 13 |
| f | 79 | n | 3 |
| g | 3.5 | o | 2 |
| h | 9 | | |

In this embodiment, the electrodes are coupled to conductive leads 42, 44, 46, which in turn may be connected to a potentiostat or conventional wired connector, such as a USB or micro-USB connector (not shown), or a wireless adaptor, configured to supply power to the sensing device and/or communicate the electrical signal generated by the sensing device with a computer, tablet, or smartphone, for example. An insulating layer 34 is applied over the interface between the various electrodes and electrical leads.

Figure 9:
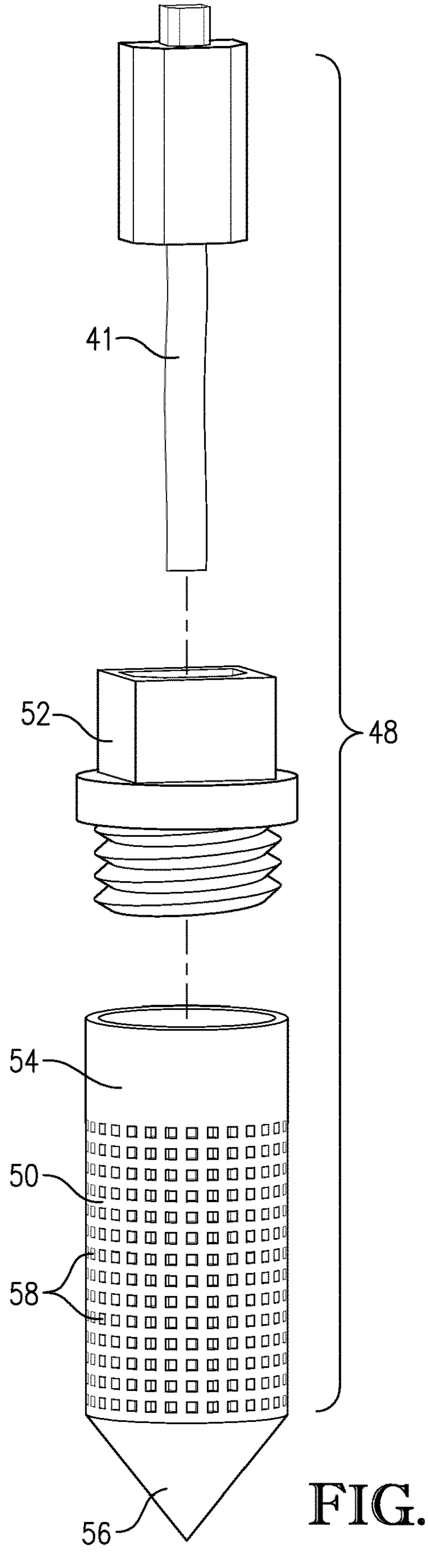
FIG. 9 is an illustration of a probe comprising an all-printed graphene sensor.
Figure 10:
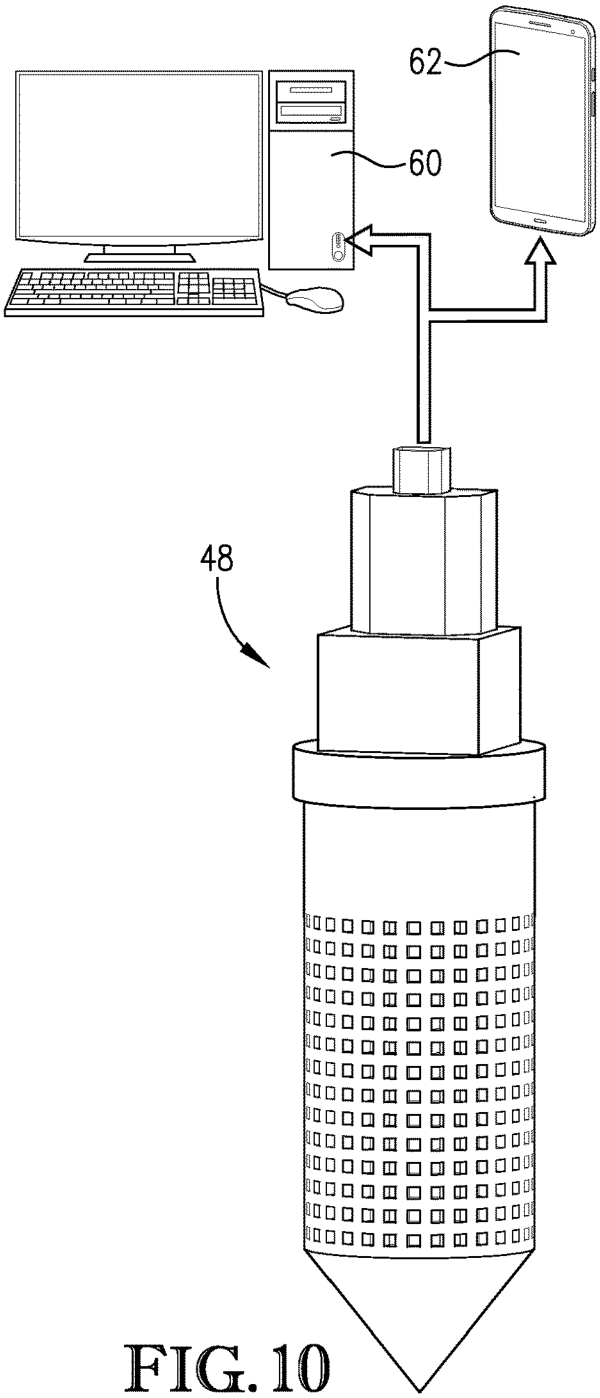
FIG. 10 is an illustration of a probe configured to be connected to an exterior device, such as a PC or portable device.

FIGS. 9 and 10 illustrates a probe 48, specifically a probe for measuring phosphate content of soil or surface water. Probe 48 comprises a cylindrical sensor housing 50 inside of which the sensing device 41 can be placed and a cap 52. Cap 52 can be configured to seal an open end 54 of the sensor housing, and also permit wires, leads, or communication connectors attached to the sensing device 41 to extend therethrough so that the sensing device 41 can be connected to a PC 60 or portable device 62 (e.g., a smart phone or tablet). Cap 52 can also be configured to secure the sensing device 41 or structures secured to the sensing device, such as a potentiostat, within the sensor housing 50. The sensor housing may also be configured with conical distal end 56 to permit the probe 48 to be more conveniently deployed into the soil for which sampling is desired. Sensor housing 50 is provided with a plurality of openings 58 that permit communication between the interior of the housing and the external environment so that the sample being tested may come into contact with the sensing device 41.

In one embodiment, the graphene electrodes can be provided in an unadulterated or pristine condition. Testing for the presence of a target substance can then occur within a prepared medium that is specific to induce an electrochemical reaction, such as a redox reaction, with the target substance.

In such embodiments, the sample to be tested, e.g., the soil sample, is dispersed within a liquid medium comprising a recognition agent that is operable to react with the target substance. In one or more embodiments, the liquid medium also comprises a supporting electrolyte and a proton donating species. The selection of recognition agent, supporting electrolyte, and proton donating species (but especially the recognition agent) are affected by the target substance that the sensing device is configured to detect and/or measure. In a preferred embodiment, the sensing device is operable to detect and/or measure the concentration of a target substance that comprises phosphorus, namely a phosphorous compound or a phosphate ion. In such embodiments, the recognition agent selected preferably comprises molybdenum. Even more preferably, the recognition agent is a molybdenum compound such as ammonium tetra molybdate or ammonium heptamolybdate tetrahydrate. In one or more embodiments, the liquid medium is aqueous and comprises a salt, such as a chloride salt (e.g., KCl) as the supporting electrolyte. In one or more embodiments, the proton donating species is an acid, preferably a mineral acid such as $H_2SO_4$.

In certain embodiments, the molar concentration of the recognition agent (e.g., ammonium tetra molybdate) with the medium is preferably from 0.1 mM to 10 mM, from 0.5 mM to 5 mM, or from 1 mM to 2 mM. In certain embodiments, the molar concentration of the supporting electrolyte within the medium is preferably from 0.01 M to 1 M, from 0.05 M to 0.75 M, or from 0.1 M to 0.5 M. In certain embodiments, the concentration of the proton donating species within the medium is preferably from 0.01 M to 1 M, from 0.05 M to 0.75 M, or from 0.1 M to 0.5 M. In one or more embodiments, the medium has an acidic pH, preferably a pH of less than 3, less than 2, or less than 1. In particular embodiments, the medium has a pH of from 0 to 3, from 0.25 to 2, or from 0.5 to 1.

In use, a sample that contains the target substance, e.g., a soil sample, is dispersed within the liquid medium thereby releasing the target substance from the sample. The target substance is then free to react with the recognition agent, which effects a change in oxidation state of the target substance (e.g., the phosphorus). The sensing device is brought into contact with the medium and a current is passed through the sensing device. The sensing device detects a current signal that is proportional to the concentration of the target substance within the sample at a characteristic voltage. In certain embodiments where the sensing device is a phosphate sensor, the sensing device is capable of detecting molar concentrations of phosphate molecules as little as 1 μM. In particular embodiments, the phosphate sensor is configured to detect phosphate molar concentrations of from 1 μM to 1 mM, from 5 μM to 750 μM, or from 10 μM to 500 μM.

In one or more embodiments, the step of detecting the current signal with the sensing device comprises performing cyclic voltammetry or differential pulse voltammetry analysis. The cyclic voltammetry can be performed with a scan rate of from 10 to 100 mV/s. The differential pulse voltammetry can be performed using a potential range of from −0.2 to 0.3 V.

In an alternate embodiment, the graphene electrodes can be functionalized with a species that is configured to induce an electrochemical reaction, such as a redox reaction, with the target substance. The functional species can be bound to the graphene electrode post-printing of the electrode through the use of, for example, a binding agent such as a polysaccharide.

The testing method in this embodiment is similar in many respects to that described above. However, the medium within which the sample is dispersed need not comprise a recognition agent. Instead, the printed graphene electrode that comprises the sensing device includes a functional species that is bound to the graphene electrode and operable to induce an electrochemical reaction with the target substance. In one or more embodiments, a functional species comprising tungsten may also be used in place of a functional species comprising molybdenum. The tungsten can be metallic tungsten in any form, such as a thin film, nanoparticles that are printed, or an electrodeposited tungsten material. The sensing device then detects a peak current signal much in the same manner previously described.

It is noted that in one or more embodiments, the sensing devices described herein may operate in a variety of pH conditions. As previously mentioned, in some embodiments it may be preferable to utilize a proton donating species in the medium in which the sample to be tested is dispersed. The forms in which phosphorus exists changes according to the pH. The pKa values for dissociation of phosphoric acid into $H_2PO4^-$, $HPO4^{2-}$, and $PO4^{2-}$ are 2.1, 7.2, and 12.3, respectively. Therefore, depending upon the phosphate species for which detecting is desired, the pH of the medium can be varied accordingly, which can mean avoiding the use of the proton donating species entirely.

Sensing devices according to one or more embodiments of the present invention have demonstrated a sensitivity of 0.3223±0.025 μA μM-1 cm−2 with a limit of detection of 2.2 μM and linear sensing range from 1 μM to 600 μM. These values represent significant ranges for the detection of phosphate in soil and water samples.

In one or more embodiments, the sensing devices exhibit little susceptibility to interfering ions that may also be present within the sample, such as such as $Cl^-$, $NO_3^-$, $CO_3^-$, and $SO_4^{2-}$. In addition, the sensing devices exhibit minimal hysteresis errors in terms of measuring increasing or decreasing concentrations of the target substance. In one or more embodiments, the sensing device exhibits a hysteresis error of less than 10%, less than 7%, less than 5%, less than 2% or less than 1% of peak current at varying target substance (e.g., phosphate) concentrations.

The sensing devices can be deployed in a number of ways. In one embodiment, the sensing device can be placed within the soil itself, preferably 2 to 4 inches deep in surface moist soil. The sensing device can also be placed in an aqueous medium along with or alongside the soil so that continuous monitoring of the presence of and leachability of soil phosphorus, for example, can occur. The sensing device can also be integrated into an autonomous vehicle, such as a land or aerial drone. In the case of an aerial drone, testing of surface water for phosphate levels can occur by flying the drone over the body of surface water and dipping the sensing device into the water. These methods of deployment are merely exemplary and are not intended to be limiting upon the scope of the present invention.

EXAMPLES

The following Example describes the synthesis of graphene ink and its use in the fabrication of phosphate sensor electrodes. This Example is provided by way of illustration and should not be taken as limiting upon the scope of the present invention.

Liquid phase exfoliation (LPE) of graphite and synthesis of graphene ink. Polymer-assisted (ethyl cellulose (EC)) LPE of graphite to graphene, graphene ink (with EC) preparation from obtained graphene/EC powder, microplotter printing of graphene ink for sensor electrodes followed by electrochemical sensing measurements are schematically illustrated in FIG. 1.

The detailed experimental procedure for polymer-assisted LPE of graphite to graphene and subsequent steps in preparing graphene ink are described below. 1.0 g of ethyl cellulose polymer (EC, Sigma-Aldrich) was dissolved in 200 mL of ethanol (99.2%, Decon Laboratories Inc.) by sonication. Then, 10 g of natural graphite flakes (99%, ~325 mesh particle size, Sigma-Aldrich) were added to the above EC solution and the suspension was probe sonicated for 6 h at 100% digital amplitude with 5 sec pulse on and off mode in an ice bath (Q500 Sonicator, QSonica, 500 Watts, 20 kHz). A centrifuge (Hermle Z36-HK) was used at 5,000 rpm speed for 15 minutes to separate the few to multi-layer graphene from larger unexfoliated materials. The supernatant (~80% by volume) containing a few layers of graphene/EC was carefully collected. The centrifugation process was repeated until all the exfoliated graphene was collected. The supernatant from the centrifugation process was filtered through a 5 μm syringe filter to further eliminate large graphene flakes. The filtered suspension was flocculated using aqueous sodium chloride (NaCl, Thermo Fisher Scientific) solution by keeping a 1:2 volume ratio between the graphene/EC suspension and the NaCl solution of 0.04 g/mL. The flocculated graphene/EC flakes were vacuum filtered using a 0.45 μm mixed cellulose esters (MCE) hydrophilic filter membrane with the addition of water to remove residues. The washed graphene/EC powder was dried on the hot plate at 50° C. for 8 h. To prepare the graphene ink, 70 mg of dried graphene/EC powder was suspended in 1.0 mL of cyclohexanone (99%, Sigma-Aldrich) and terpineol (mixture of isomers, anhydrous, Sigma-Aldrich) mixture (ratio of 85:15 v/v) and bath sonicated for 3 h.

Characterization of graphene from LPE. Raman and TEM of LPE processed graphene with EC and the TEM and AFM of annealed LPE processed graphene confirmed the presence of multilayer graphene flakes (average thickness ~10 layers). The temperature corresponding to the weight loss shown in the TGA was used for determining the annealing conditions of graphene to remove the EC and solvents.

Thermogravimetric analysis (TGA) of the graphene/EC powder from LPE was conducted with a temperature ranging from 25° C. to 800° C. using TGA 209 F1 Libra to determine the thermal stability of graphene and the temperature at which the volatile components such as solvent and/or EC in the sample gets removed. Note that the TGA measurement was performed in a nitrogen environment to observe the weight loss, whereas the graphene is generally treated in ambient air at 350° C. Since, graphene does not generally oxidize at 350° C. in air, an annealing in this condition is safe to remove the solvent and EC. FEI Tecnai Osiris Transmission Electron Microscope (TEM) was used to obtain high-resolution images of the LPE processed graphene flakes before and after annealing using an accelerating voltage of 200 kV. The graphene flakes with EC sample for TEM characterization was prepared by diluting the graphene ink in isopropanol while the annealed graphene flakes sample was prepared by diluting the heat-treated (350° C.) graphene/EC powder from LPE in isopropanol solvent. Both samples were drop cast on a 400-mesh copper grid with lacey carbon support film and air dried before imaging. The selected area electron diffraction (SAED) measurement was carried out using the same TEM instrument. The annealed powder diluted in isopropanol used for TEM imaging was also used for the thickness measurement study of the graphene flakes with Veeco Multimodal atomic force microscopy (AFM) in a tapping mode. The structural fingerprint of graphene/EC powder from LPE was probed by vibrational modes of molecules using Renishaw Invia Raman Microscope in backscattered mode with an excitation wavelength of 532 nm from a laser source with 20 mW of power. The measurement was taken with a 100× objective lens (NA=0.90) with a laser power of 1 mW using extended mode covering a wide spectral window of 800 to 3200 $cm^{-1}$.

The structure of graphene material with EC from LPE was analyzed using Raman spectroscopy, TGA and TEM. The primary Raman peaks from $sp^2$ hexagonal honeycomb carbon (that is, G and 2D peaks) as well as the peaks arising from edge effects and structural defects (D-peak) were used for the evaluation of the LPE processed graphene samples. The G peak indicates in-plane vibrations of $sp^2$ hybridized carbon atoms in graphene/graphite. The D peak arises from the breathing mode of $sp^2$ carbon rings, and it gets activated in the presence of defects. The 2D peak is an overtone of the D peak but does not require defects for activation. Additionally, the D' peak denotes a weak disorder induced feature. The Raman peaks with peak positions approximately at 2720.24, 1582.76, and 1350.88 $cm^{-1}$ correspond to 2D, G, and D bands of graphene material, respectively. The intensity ratio of $I_D/I_G$ band measures the number of defects and disorders introduced in the graphene flakes in the LPE process whereas the $I_{2D}/I_G$ reflects the number of graphene atomic layers. The $I_{2D}/I_G$ and $I_D/I_G$ ratios of the graphene material with EC are calculated to be 0.51 and 0.22, respectively. These values indicate multilayer graphene with some degree of defects. The graphene/EC powder subjected to TGA analysis revealed that the decomposition peak of EC starts at 250° C. The material is also observed to be stable at a much higher temperature of 800° C. in the analysis. The graphene was further characterized using TEM. Representative TEM images reveal the effective exfoliation of graphite into few atomic layered graphene (less than 10 layers are visible). In a low magnification image, the structure of folded graphene flakes as well as the presence of ethyl cellulose (EC) polymeric particles are visible that were introduced during the LPE process to prevent the exfoliated graphene flakes from aggregation.

To further characterize the quality of annealed graphene flakes, bright-field TEM, and AFM analysis over a large number of flakes were carried out. Careful assessment of the graphene edges revealed the number of layers present in a typical graphene flake to be less than 10 layers. In addition, the EC that appeared in earlier images was not observed in post-thermal treatment of graphene/EC suggesting the successful removal of polymer through an efficient heating process. The selected area electron diffraction (SAED) pattern demonstrates a six-fold symmetry with the hexagonal arrangements of typical graphene implying the high-quality crystallinity of the material. The inherent properties of graphene explored in a plethora of applications today are often influenced by the quality and lateral size of flakes. The graphene sheets generated in the LPE process in this work have lateral dimensions of less than ~1 μm which can be useful in applications such as ceramic composites, energy storage, and a number of other applications, including the present study on sensing. Atomic force microscopy (AFM) measurement was conducted to validate the graphene sheet thickness results obtained from TEM analysis. Over forty different graphene flakes were picked up for the analysis of the average thickness. The thickness distribution of graphene flakes indeed confirms that the flakes are in the 2-6 nm range with an average flake thickness of ~3.5 nm (maximum flakes are around 10 layers), further confirming the results obtained from TEM measurements.

Microplotter printing of graphene sensors. Graphene ink was utilized in printing sensor electrodes for various physical characterizations and electrochemical tests. The sensor electrodes with a working area of 3×3 mm were printed at room temperature using a Microplotter (Microplotter II, Sonoplot).

The microplotter with a piezoelectric dispensing unit attached to a glass tip of 40 μm nozzle diameter was used. Kapton films with 10 mil thickness and a temperature limit of 400° C. (Creative Global Services Inc.) were used as the substrate material for printing the sensor devices. Before printing, the untreated Kapton films were cleaned using acetone, isopropanol, and methanol for 5 min respectively in a bath sonicator. Subsequently, they were dried using a nitrogen spray gun to remove the remaining microscopic dry dust and fibers. As a final step, the printed electrodes were annealed on a hot plate for 2 h at 350° C. to decompose the EC polymer and remove the cyclohexanone and terpineol solvents.

Prior to electrochemical measurements, the graphene sensor electrodes were further integrated with silver contact pads using a Voltera desktop PCB printer (V-One model). An insulating layer (commercial nitrocellulose and acetate-based polymer mixture with isopropyl alcohol) was coated above the working area of the electrode to confine the redox reaction only in the square geometry of the working electrode.

Characterization. Various characterization methods, such as Thermogravimetric analysis (TGA), Optical Microscopy, Field Emission Scanning Electron Microscopy (FESEM), Transmission Electron Microscopy (TEM), Atomic Force Microscopy (AFM), Raman Spectroscopy, and X-ray Photoelectron Spectroscopy (XPS), Four-Probe Electrical Measurements, and Profilometer were employed to characterize the LPE processed graphene as well as the printed graphene sensor electrodes.

The large-scale uniformity of the printed graphene surface on the sensor electrode was acquired using an Olympus BX 51 optical microscope. The surface topography of the printed graphene sensor electrode before and after annealing was imaged using the Hitachi SU8230 Field Emission Scanning Electron Microscopy (FESEM) at 5 kV accelerating voltage. The printed graphene sensor electrode was coated with a 2 nm iridium conductive layer to inhibit any possible charging effects and electron beam induced thermal damages. FESEM was also used to obtain the cross-sectional image of the sensor electrode. Raman measurement with similar parameters as mentioned before for LPE processed graphene was taken for as-printed and annealed sensor electrodes. The elemental composition and chemical state of atoms in annealed and as-printed graphene sensor electrodes were examined using Thermo Scientific K-alpha X-ray photoelectron spectroscopy (XPS) using Aluminum X-ray source with 200 eV pass energy, and 1 eV energy step, whereas the high-energy resolution spectrums were obtained with a 50 eV pass energy and 0.1 eV energy step. The electrical sheet resistance of the printed graphene sensor electrodes was measured using a four-probe measurement system (Signatone). MPP graphene of 1 cm×1 cm with different printing passes (1, 3, 5, and 8) were used for this measurement. The thickness of the 1 cm×1 cm printed graphene sample with eight printing passes was measured using a surface profilometer (Veeco Dektak 150 Stylus Surface Profiler).

The thickness of the MPP graphene with eight printing passes was found to be (2.33±0.13) μm. The profilometer measurement agrees with the cross-sectional SEM of eight printing passes electrode.

The 2D peak of graphene before annealing has a small shoulder that can be fitted into two different component peaks as compared to the 2D peak of annealed graphene that has a single Lorentzian peak. This shows the presence of multilayer graphene with polymer in the sample before annealing. The XPS measurement provides the chemical bonding configuration of constituent atoms, particularly, the bonding environments of carbon and oxygen functional groups (oxygen as adsorbents or defects) in the printed graphene devices before and after annealing. The C1s and O1s spectrums were subtracted with Shirley background and calibrated to 284.5 eV of $sp^2$ C1s peak. The $sp^2$ peaks corresponding to the C1s spectrum of annealed and as-printed samples were fitted with an asymmetric Lorentzian with a damping effect (LF line shape), whereas all other peaks were fitted using Gaussian/Lorentzian product formula (GL30 line shape), here 30% attributes to Lorentzian and 70% for Gaussian. The binding energies (eV) in the C1s XPS spectrum in as-printed graphene surface are as follows: 284.5, 286.18, 287.82, and 289.13 eV representing $sp^2$, $sp^3$, C—O (hydroxide), and C═O (carbonyl) local bonding environment, respectively. The fitted peak positions in annealed printed graphene electrodes are at 284.5, 285.45, 286.37, and 290.38 eV binding energies for $sp^2$, $sp^3$, C—O, and π-π* shake up satellite respectively for the carbon 1 s orbital. The shake-up satellite is induced by π-π* transitions, where electrons in the highest occupied molecular orbitals (HOMO) are advanced to the lowest unoccupied molecular orbital (LUMO). Additionally, the O1s orbital peaks were deconvoluted to three peaks corresponding to hydroxide (C—O), carbonyl (C═O), and carboxyl (O—C═O). The O1s orbital indicates that the maximum number of carbon atoms interact with oxygen in the hydroxide functional group regardless of heat treatment.

Electrochemical characterization and sensing. All the electrochemical experiments were conducted at room temperature using a potentiostat (Interface 1010E from Gamry Instruments) along with Ag/AgCl (3M NaCl) reference electrode 38, platinum wire counter electrode 40 and annealed printed graphene working electrode 26 produced from microplotter printing mentioned earlier. See, FIG. 1. The electrochemical properties of the microplotter printed (MPP) graphene sensor electrode were investigated by employing the cyclic voltammetry (CV) technique using a 10 mM potassium hexacyanoferrate (III) standard redox probe (($K_3[Fe(CN)_6]$), Sigma-Aldrich) in 0.1 M potassium chloride (KCl) supporting electrolyte. CV was also performed for phosphate sensing using 1 mM ammonium heptamolybdate tetrahydrate ($(NH_4)_6Mo_7O_{24}\cdot4H_2O$), Sigma-Aldrich), 0.1 M sulfuric acid ($H_2SO_4$, Thermo Fisher Scientific), 0.1 M potassium chloride (KCl, Sigma-Aldrich) and 1 μM to 1000 μM potassium dihydrogen phosphate ($KH_2PO_4$, Sigma-Aldrich) as phosphate analyte. Similar solvents/chemicals were used for the differential pulse voltammetry (DPV) measurements for phosphate sensing in the potential window from 0 V to 0.6 V with a pulse size of 50 mV and an accumulation time of 5 sec. All electrochemical experiments were repeated several times (n, representing number of times performed, with n>3).

MPP graphene characterization: Printed sensor electrodes fabricated via direct ink writing of graphene ink using a microplotter printing system were used for structural, electrical, and electrochemical characterization. The microplotter system also has the capability of printing a variety of electrode patterns. All MPP graphene sensor electrodes were subjected to annealing before using in electrochemical measurements. FIG. 2 shows a schematic of the final graphene sensor electrode used for electrochemical sensing experiments after coating the silver paste as a contact pad and insulating material (a transparent polymer) as a passivation layer.

The electrical sheet resistance of the annealed MPP graphene of different printing passes was measured using a four-probe electrical measurement system. As the number of printing passes increases the sheet resistance of the annealed MPP graphene decreases before attaining a near saturation at five printing passes (~55Ω/□). This is possibly due to attaining a percolation-to-bulk threshold transition via a network of graphene flakes. From the sheet resistance value and the thickness of an MPP graphene with eight printing passes extracted from the cross-sectional SEM and profilometer, the electrical conductivity was found to be 8,072.372 S/m, higher than many reported values. The electrode with eight printing passes was chosen for the calculation assuming its high packing density of flakes. Due to an apparent saturation of high electrical conductivity at five printing passes, electrochemical sensing experiments were performed using these electrodes.

The Raman spectra of an annealed MPP graphene sensor electrode showed that the G, D and 2D bands were observed at 1583, 1351, and 2719 $cm^{-1}$, respectively. The value obtained for the intensity ratio of $I_{2D}/I_G$ was 0.43. This ratio exhibits the existence of multilayer graphene. This finding agrees well with the Raman, TEM, and AFM characterization of LPE processed graphene described earlier proving no structural change in graphene post-printing and annealing. In addition, the intensity ratio of $I_D/I_G$ obtained for the annealed MPP graphene sensor electrode was 0.19, smaller than the previously reported values proving the high quality of graphene with minimal defects produced through the LPE method. The surface chemistry of the as-printed and annealed MPP graphene sensor electrode was investigated by XPS. The as-printed graphene sensor electrode demonstrates a significant amount of oxygen functional groups attached to carbon in the C1s spectrum. This is largely due to the presence of EC and some inherent impurities from graphene. The efficient heat treatment employed on the printed electrodes reduced a significant portion of these functional groups in the C1s spectrum, further proving the high quality of graphene.

Electrochemical behavior of printed graphene sensors. Cyclic voltammetry (CV) was performed on printed electrodes of different printing passes (1, 3, 5 and 8) with 10 mM $K_3[Fe(CN)_6]$ standard redox probe in 0.1M KCl supporting electrolyte with a potential window between −0.2 to 0.6 V. CV values for acquired for all printing passes at different scan rate from 5 to 100 mV/s. The characteristic redox peaks obtained for 3, 5, and 8 printing passes were attributed to the oxidation/anodic and reduction/cathodic of ferrocyanide ($Fe(CN)_6^{4-}$) and ferricyanide ($Fe(CN)_6^{3-}$) redox couple respectively as per equation (3) and (4). The CV obtained from the electrode of 1 printing pass showed oxidation peaks in slow scan rates that disappear at higher scan rates. All scan rates for this electrode showed no reduction peak at all. This unusual appearance of CV was due to the slow heterogeneous electron transfer kinetics as a consequence of very large resistance in a single-pass electrode.

Additionally, the CV curves indicated shifts in the peaks for both oxidation and reduction redox processes when the scan rate is increased from 5 to 100 mV/s contributing to the increase in peak-to-peak separation ($\Delta E_p$). For an ideal reversible system, the $\Delta E_p$=57/n mV, a thermodynamically established theoretical value, where n is the number of electrons transferred in the redox event (n=1 in this reaction). The $\Delta E_p$ was calculated from the CV plots for the electrodes with varying printing passes ranges between 180-575 mV using the equation ($E_{pa}-E_{pc}$), where $E_{pa}$ is the anodic peak potential and $E_{pc}$ is the cathodic peak potential. These results are shown in Table 2.

TABLE 2

| | | Peak Separation ($\Delta E_p$) Number of Printing Passes | | | |
|---|---|---|---|---|---|
| | | 1 | 3 | 5 | 8 |
| Scan | 5 | N/A | 203.9 | 212.8 | 180.5 |
| | 10 | N/A | 260 | 257 | 221 |
| | 25 | N/A | 351.7 | 348.78 | 294.9 |
| | 50 | N/A | 463.3 | 449.5 | 377.1 |
| | 100 | N/A | 575 | 541 | 459.5 |

The large $\Delta E_p$ calculated represents a quasi-reversible redox reaction ascribed to sluggish electron transfer kinetics at the graphene electrode. Although estimated $\Delta E_p$ values are larger than the ideal value, with an increase in number of printing passes the $\Delta E_p$ value decreases for most of the scan rates indicating improvement in the reversibility of the system. This trend is consistent with the enhanced electrical sheet resistance of the sensor electrodes as the printing passes increase.

$$Fe(CN)_6^{4-} \xrightarrow{\text{oxidation}} Fe(CN)_6^{3-} + e^- \quad (3)$$

$$Fe(CN)_6^{3-} + e^- \xrightarrow{\text{Reduction}} Fe(CN)_6^{4-} \quad (4)$$

Electrochemical Sensing of Phosphates using Cyclic Voltammetry. Next, electrochemical phosphate sensing was conducted by employing printed graphene as the working electrode in a CV technique. As indicated in the established molybdenum blue method, molybdenum was first utilized to generate stable complexes with phosphate ions (P—Mo complex) in the presence of $H_2SO_4$ to uphold the necessary acidic pH alongside the KCl supporting electrolyte. Then, electrochemical signal transduction was measured based on the charge carrier exchange between the graphene working electrode and the P—Mo complexes located in close proximity to the graphene surface. CV results were generated at 50 mV/s with a potential range between −0.1 to 0.6 V. Before the addition of phosphate ions, no apparent oxidation and reduction peaks were identified in the CV with respect to the Ag/AgCl reference electrode. However, after the addition of 100 μM phosphate solution, the voltammogram shows two distinct oxidation and reduction peaks respectively attributing to the strong electrochemical activity between the graphene electrode surface and the phosphate ions in the presence of Mo redox probe (P—Mo complex). The oxidation peaks observed around 0.19 and 0.35 V belong to Mo (II) to Mo (IV) and Mo (IV) to Mo (VI), respectively. Whereas the reduction peaks observed around 0.3 and 0.13 V are likely due to the electrochemical reduction of Mo (VI) to Mo (IV) and Mo (IV) to Mo(II), respectively. The mechanism of the electrochemical reduction reaction could be understood from equation (5) below, where the P—Mo complex formed in acidic media (equation 1) is reduced to mixed molybdenum oxidation states by gaining electrons in a multielectron process (equation 5). The reduced Mo in the complex oxidizes back by losing electrons giving rise to the oxidation peaks.

$$PMo_{12}O_{40}^{3-} + ne^- + nH^+ \rightarrow [H_nPMo_m(X)Mo_{12-m}(Y)O_{40}]^{3-}, \quad (5)$$

$X$, $Y$ = Oxidation States of Mo

The CV response of the MPP graphene sensor electrode with different phosphate concentrations in the acidic electrolyte solution (PH ~0.75) was determined. As the concentration of phosphate ions increases from 1 to 1000 μM, the oxidation and reduction peaks at 0.19 and 0.13 V increase, indicating the phosphate sensing capability of the graphene electrode. The calibration plots for oxidation and reduction peak current at 0.19 and 0.13 V respectively were plotted separately for different phosphate concentrations. The calibration plots for the graphene printed electrode showed two distinct regions for sensing, one at lower and the other at higher phosphate concentrations. At lower concentrations, the MPP graphene electrode has many available electroactive sites that allow electrochemical redox processes to occur simultaneously, leading to higher sensitivity. However, at higher analyte concentrations, fewer simultaneous redox reactions occur because (1) the quantity of P—Mo complexes surpasses the electroactive reactive sites and (2) the accumulation or crowding of oxidized/reduced products of P—Mo complexes near the graphene surface. This causes slower reaction kinetics, ultimately leading to decreased sensitivity.

To further understand the kinetics of electrochemical phosphate sensing, a CV was run in the presence of 100 μM phosphate at different scan rates from 10 to 200 mV/s. Both the anodic and cathodic peaks (magnitude) in CV show an increasing trend with respect to scan rate. The oxidation peak at 0.19 V was chosen to plot the peak current vs. square root of scan rate graph. This peak was particularly chosen due to its excellent response to the increase in phosphate concentration from 1 to 1000 μM from earlier CV experiment. The relationship between the peak current ($i_p$) and the square root of scan rate ($\upsilon^{1/2}$) is linear indicating that the charge transfer reaction (corresponding to the change in the phosphate oxidation) occurs via diffusion rather than adsorption. The peak current fits the equation $i_p$=−20.81321 (±1.98)+12.4766(±0.19) $\upsilon^{1/2}$ with $R^2$=0.9975.

Figure 3:
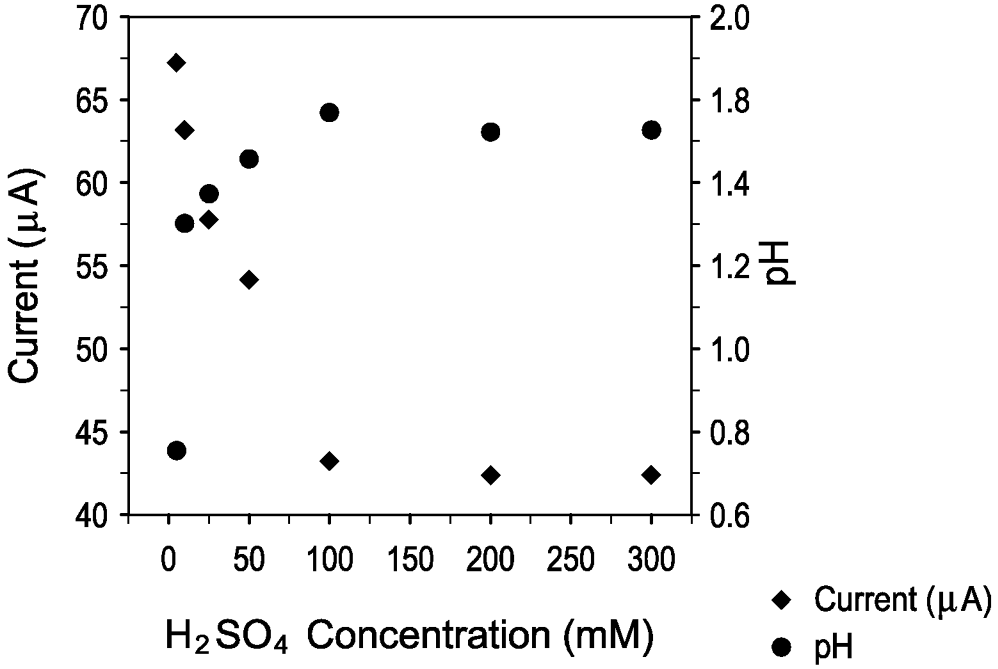
FIG. 3 is a chart depicting sensor pH and peak current (signal) stability of an exemplary printed graphene sensor at different acid concentrations.
Figure 4:
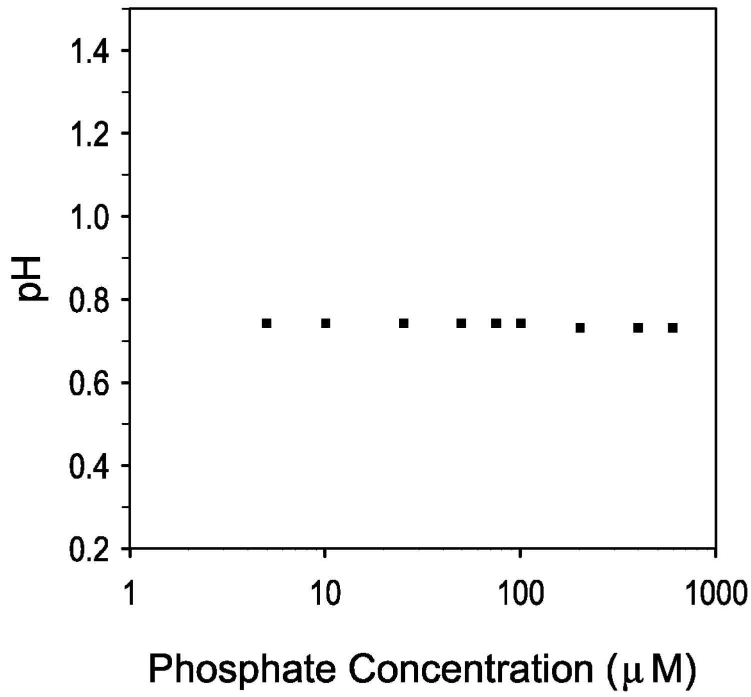
FIG. 4 is a chart depicting sensor pH stability as the phosphate concentration varies in the sensing medium.

Influence of $H_2SO_4$. Evaluation of different concentrations of $H_2SO_4$ (0.005M to 0.4 M) on electrochemical activity of the P—Mo complex was demonstrated. When $H_2SO_4$ is absent in the electrolyte no significant peaks are observed proving that electrochemical reactions are less preferred by the graphene electrodes (according to the chemical equation (1)). Whereas upon the addition of sulfuric acid, notable electrochemical redox reactions are observed owing to the rich hydrogen ions species in the solution. Therefore, the prominent oxidation and reduction peaks observed during phosphate sensing near the graphene electrode are due to the effectiveness of the acidic condition. FIG. 3 shows that the peak current for the oxidation peak at 0.19 V is highest at 0.1 M $H_2SO_4$ possibly due to the effective P—Mo complex formation at this particular pH. Hence, a 0.1 M concentration of sulfuric acid was fixed for all the phosphate sensing experiments. The change in pH of the sensing medium was also recorded when different phosphate concentration was added (FIG. 4). The results indicate that there is no significant change in the pH as the phosphate concentration increases.

Differential pulse voltammetry sensing of phosphate. The cyclic voltammetric response to the phosphate ions were further studied precisely by DPV analysis. DPV is a more sensitive technique that typically provides the exact potential of oxidation and/or reduction reactions (sensing) on the electrode with highly resolved peaks compared to CV by minimizing background charging currents. This helps in detecting a much smaller concentration of analyte in the system with a high signal-to-noise ratio. The anodic peaks from CV were chosen to closely monitor in the DPV analysis. The peak currents attained from the phosphate sensing were determined. The increase in the anodic peak current in the set potential range with increasing phosphate concentration confirms that the MPP graphene sensor electrode exhibits excellent electrocatalytic activity towards phosphomolybdate (P—Mo) oxidation. Within this potential, the DPV curve shows the increasing oxidative transformation of Mo (II) species to Mo (VI) complex with phosphate ions at the graphene electrode surface. The analytical linear correlation between the peak current response vs. phosphate concentration was determined for the anodic peak observed at 0.19 V. Two linear ranges are observed for 1-100 μM and 100-600 μM of phosphates, respectively. The concentration dependent correlation fitting equations are $I_{pa}$ (μA)=0.31574 μM+6.819 and $I_{pa}$ (μA)=0.0713 μM+33.014; with $R^2$ values 0.9830 and 0.95598 corresponding to 1-100 μM and 100-600 μM, respectively. The sensitivity within the two different linear sensing ranges (1-100 and 100-600 μM) were calculated to be 0.3223±0.025 and 0.0792±0.015 μA μM$^{-1}$ cm$^{-2}$ respectively. The LOD was found to be 2.2 μM for the MPP graphene sensor electrode. Therefore, the reliable linear range of detection of phosphates using the MPP graphene electrode is found to lie between 1-600 μM. Table 3 below shows the performance of Mo redox probe-based phosphate sensing of different electrode materials, with which the MPP graphene phosphate sensor is being benchmarked.

TABLE 3

| Electrode materials | Redox Probe | Detection method | Linear range (μM) | LOD (μM) |
|---|---|---|---|---|
| Graphene MMP Electrode | Mo | DPV | 1-600 | 2.2 |
| Mo-Plastic electrode | Mo | SWV | 0.001- | 0.006 |

TABLE 3-continued

| Electrode materials | Redox Probe | Detection method | Linear range (μM) | LOD (μM) |
|---|---|---|---|---|
| | | | 0.075 | |
| Mo/CB-SPE/Paper | Mo | CV | 10-300 | 4 |
| PSS/PEDOT/Chit/Mo/GCE | Mo | Amperometry | 0.19-95 | * |
| Mo/Chit/GCE | Mo | SWV | 0.1-2 | 0.15 |
| Prussian blue/GCE | Mo | SWV | 500000- | 38.3 |
| Mo-Phosphate/Pencil graphite electrode | Mo | DPV | 5000000 10-100 | 1.25 |
| $ZrO_2$/ZnO/MWCNTs/Mo/SPE | Mo | CV | 0.037-1.1 | 0.02 |
| Carbon black/SPE | Mo | Amperometry | 10-80 | 6 |
| Screen printed graphite electrode | Mo | CV | 0.5-1000 | 0.3 |
| Mo/PVC/pencil graphite electrode | Mo | DPV | 0.02-1 | 0.02 |

Figure 5:
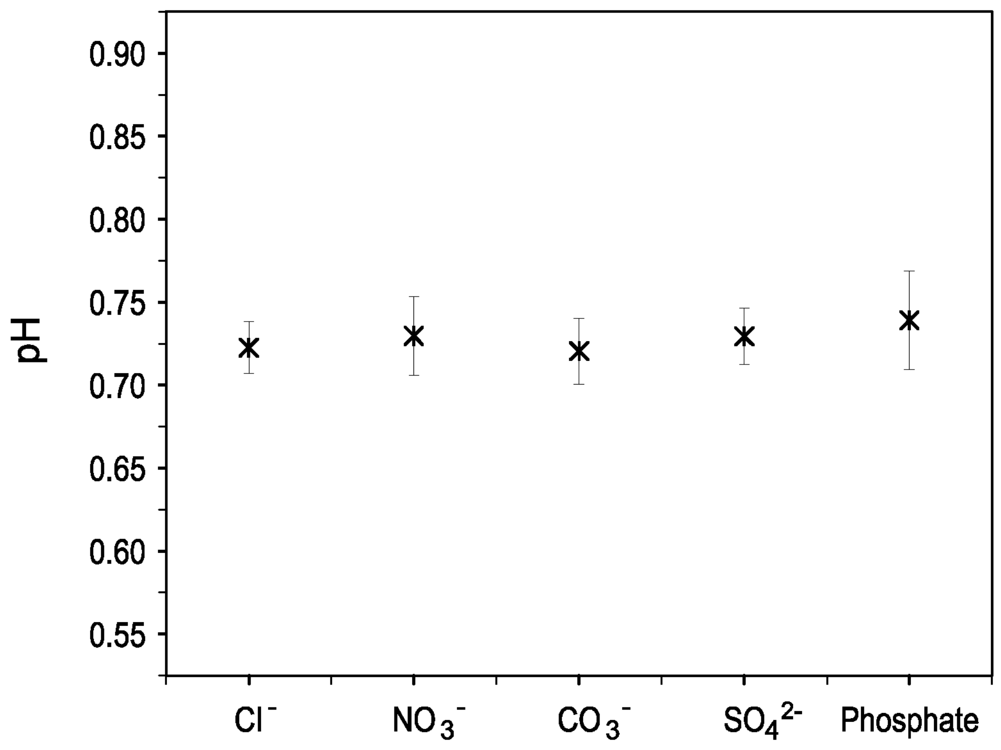
FIG. 5 is a chart depicting sensor pH stability as different interfering ions are present in the sensing medium.

*Not measured;
Mo-Molybdate;
DPV -Differential pulse voltammetry;
CV- cyclic voltammetry;
SWV- Square wave voltammetry, Interference, reproducibility, and stability of graphene electrodes. The selectivity of the MPP graphene sensors towards phosphates in the presence of interfering ions such as $Cl^-NO_3^-$, $CO_3^-$, and $SO_4^{2-}$ was studied due to its significance in the in-field measurements. The interfering species did not exhibit a significant alteration in the oxidation peak current demonstrating the strong selectivity of the sensors towards the phosphate ions. Overall, the DPV response for MPP graphene phosphate sensors shows negligible interference effects. This is ascribed to the low pH condition that favors higher conversion of phosphate to P—Mo complex compared with other interfering ions. As such, an accountable combination of the Mo/$H^+$ ratio and conversion efficiency of the phosphomolybdate complex is a prerequisite for the electrochemical sensing of phosphate. To ensure the pH of the sensing medium is maintained (and hence the stable P—Mo complex formation), pH was measured as various interfering ions were added. There was no significant deviation in pH due to the addition of interfering ions as shown in FIG. 5.

DPV experiments were also repeated several times (each time with a new MPP graphene sensor electrode) to study the reproducibility of the printed phosphate sensors. The change in the current for 100 μM of phosphate ions is highly reproducible across all the electrodes and is within 5% of the mean standard deviation. Additionally, the stability of a representative sensor electrode with respect to different time intervals was evaluated. The electrodes were washed and stored at room temperature before each DPV measurement. The fabricated graphene electrode presents peak currents that are within 4% of the standard deviation value.

Figure 6:
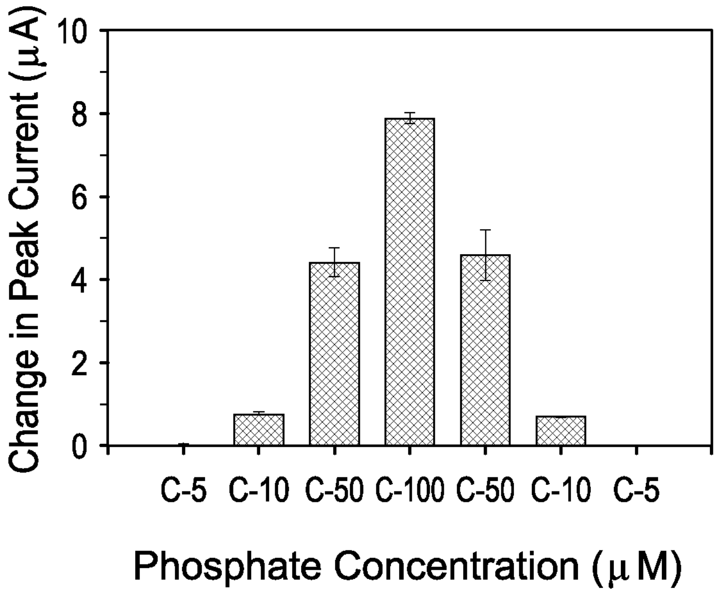
FIG. 6 is a chart depicting sensor hysteresis as the phosphate concentration gradually increases and subsequently decreases in the sensing medium.
Figure 7:
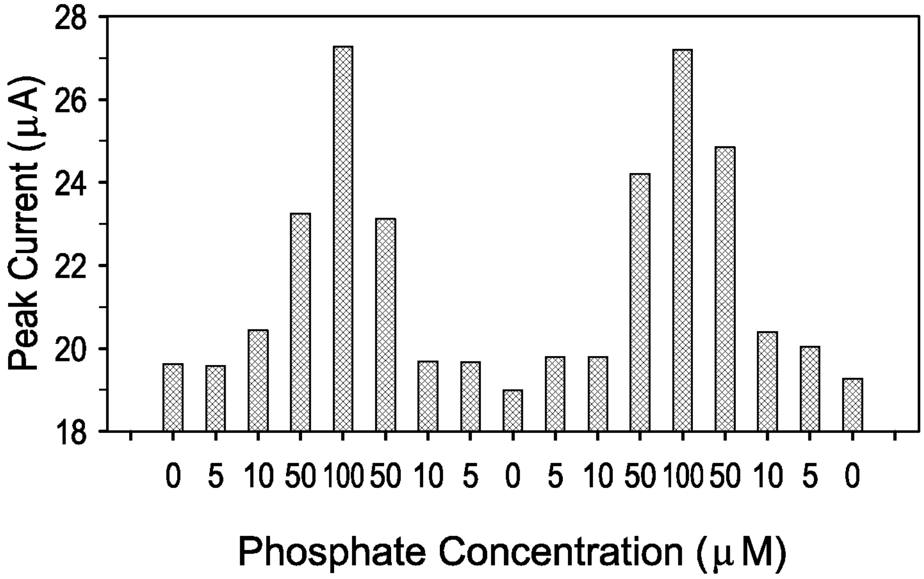
FIG. 7 is a chart depicting sensor hysteresis through two cycles of gradual increases and subsequent decreases of the phosphate concentration.

The MPP graphene sensor electrode also reliably detects phosphate ions when added from high to low concentration similar to low to high concentration. Additionally, the hysteresis was conducted by adding the phosphates to the base solution by increasing the concentration followed by decreasing the concentration. FIG. 6 shows the average change in the peak current derived from the hysteresis experiment when the phosphate concentration is increased and later decreased. Two cycles of DPV measurements with increasing and subsequent decreasing phosphate concentration was performed. The peak current values for both cycles are shown in FIG. 7.

In order to further demonstrate the stability and reliability of the printed sensors, drift analysis was conducted using the CV technique. Three different concentrations (1 μM, 10 μM, and 100 μM) of phosphates were added to the base solution and the CV response was recorded at five different time intervals (0 min, 10 min, 20 min, 40 min, and 60 min). No apparent changes were found, indicating the sensors showing no significant drift in their response.

In conclusion, a highly stable graphene nano-ink, comprising flakes with fewer than ten atomic layers was successfully formulated from graphite via a liquid phase exfoliation technique. Rigorous characterization confirmed both the structural integrity and high electrical conductivity of the graphene within the nano-ink. Microplotter-printing of the ink was used as a cost-effective approach for manufacturing graphene sensor electrodes. The printed graphene sensors were effectively employed for electrochemical quantification of phosphate ions for the first time through cyclic voltammetry and differential pulse voltammetry. The sensors exhibited consistent responses across a range of phosphate concentrations and in the presence of interfering ions affirming its stability and reliability. The developed printed graphene sensors showed a high sensitivity of 0.3223±0.025 $\mu A\,\mu M^{-1}\,cm^{-2}$ and a detection limit of 2.2 μM corresponding to phosphate detection.

We claim:

1. A method of testing a sample for the presence of a target substance comprising:

dispersing the sample within a medium comprising a recognition agent that is operable to react with the target substance;

contacting the medium within which the sample is dispersed with a sensing device, the sensing device comprising a printed graphene electrode, a counter electrode, and a reference electrode;

inducing an electrochemical reaction between the target substance and the recognition agent; and detecting a peak current signal at a characteristic applied voltage to the working electrode with respect to the reference electrode, the peak current signal being proportional to the concentration of the target substance within the sample.

2. The method of claim 1, wherein the target substance comprises a phosphate ion.

3. The method of claim 2, wherein the recognition agent comprises molybdenum or tungsten.

4. The method of claim 1, wherein the medium further comprises a supporting electrolyte and a proton donating species.

5. The method of claim 4, wherein the supporting electrolyte comprises a chloride, and wherein the proton donating species comprises sulfuric acid.

6. The method of claim 1, wherein the reference electrode comprises graphene.

7. The method of claim 1, wherein the printed graphene electrode comprises pristine few atomic layered graphene flakes.

8. The method of claim 1, wherein the printed graphene electrode is fabricated by depositing onto a thin film substrate a graphene ink comprising pristine few atomic layered graphene particles encapsulated with an exfoliating agent and dispersed in a liquid vehicle.

9. The method of claim 8, wherein the graphene ink is annealed to remove at least a portion of the liquid vehicle and to decompose substantially all of the exfoliating agent to form the printed graphene electrode.

10. The method of claim 1, wherein the step of detecting the current signal comprises performing cyclic voltammetry or differential pulse voltammetry analysis.

11. A method of testing a sample for the presence of a target substance comprising:

dispersing the sample within an electrolyte medium;

contacting the medium within which the sample is dispersed with a sensing device, the sensing device comprising a functionalized printed graphene electrode, a counter electrode, and a reference electrode, the functionalized printed graphene electrode comprising a functional species that is operable to induce an electrochemical reaction with the target substance, wherein the functional species comprises a molybdenum compound or tungsten bound to the graphene of the functionalized printed graphene electrode with a polysaccharide;

inducing an electrochemical reaction between the target substance and the functional species; and detecting a peak current signal at a characteristic applied voltage with the sensing device, the peak current signal being proportional to the concentration of the target substance within the sample.

12. The method of claim 11, wherein the target substance comprises phosphorus, a phosphorous compound, or a phosphate ion.

13. A sensing device for measuring the concentration of phosphate ions within a test sample comprising a printed graphene electrode, a counter electrode, and a reference electrode, the printed graphene electrode comprising few atomic layered graphene particles, wherein the printed graphene electrode comprises a functional species bound to the graphene of the printed graphene electrode with a binding agent.

14. The sensing device of claim 13, wherein the functional species comprises a molybdenum or tungsten compound, and wherein the binding agent comprises a polysaccharide.

15. The sensing device of claim 13, wherein the sensing device exhibits hysteresis error of less than 10% of peak current at varying phosphate concentrations.

16. A method of manufacturing a graphene electrode comprising:

printing an electrical trace onto a thin film substrate using a graphene ink, the graphene ink comprising few atomic layered graphene particles that are encapsulated by an exfoliating agent and dispersed within a liquid vehicle system;

annealing the thin film substrate having the electrical trace printed thereon to decompose the exfoliating agent and remove at least a portion of the liquid vehicle system; and applying a mixture of a functional species and a binding agent to the annealed thin film substrate over at least a portion of the electrical trace.

17. The method of claim 16, wherein the functional species comprises a molybdenum or tungsten compound, and wherein the binding agent comprises a polysaccharide.

* * * * *